United States Patent [19]

Brorein

[11] Patent Number: 4,468,089

[45] Date of Patent: Aug. 28, 1984

[54] FLAT CABLE OF ASSEMBLED MODULES AND METHOD OF MANUFACTURE

[75] Inventor: William J. Brorein, Whippany, N.J.

[73] Assignee: GK Technologies, Inc., Greenwich, Conn.

[21] Appl. No.: 396,773

[22] Filed: Jul. 9, 1982

[51] Int. Cl.³ .......................... G02B 5/16; H01B 11/00
[52] U.S. Cl. .................................... 350/96.23; 156/53; 156/55; 174/36; 174/117 F
[58] Field of Search ........... 174/36, 32, 117 R, 117 F; 350/96.23; 156/53, 56

[56] References Cited

U.S. PATENT DOCUMENTS

| | | | |
|---|---|---|---|
| 2,444,034 | 6/1948 | Collings | 174/74 R X |
| 2,851,515 | 9/1958 | Kolmorgen et al. | 174/117 R |
| 2,888,511 | 5/1959 | Guritz | 174/117 R |
| 3,005,739 | 10/1961 | Lang et al. | 174/117 F |
| 3,735,022 | 5/1973 | Estep | 174/117 F |
| 4,155,613 | 5/1979 | Brandeau | 174/36 X |
| 4,234,759 | 11/1980 | Harlow | 174/117 F X |
| 4,281,212 | 7/1981 | Bogese | 174/36 |
| 4,308,421 | 12/1981 | Bogese | 174/32 |
| 4,331,379 | 5/1982 | Oestreich et al. | 350/96.23 |
| 4,355,865 | 10/1982 | Conrad et al. | 350/96.23 |

FOREIGN PATENT DOCUMENTS

| | | | |
|---|---|---|---|
| 134160 | 2/1979 | German Democratic Rep. | 174/36 |
| 483714 | 4/1938 | United Kingdom | 174/117 R |

Primary Examiner—Fred L. Braun
Assistant Examiner—Morris H. Nimmo
Attorney, Agent, or Firm—Hopgood, Calimafde, Kalil, Blaustein & Judlowe

[57] ABSTRACT

A flat communication cable is formed of an assembly of standardized modules in edge-to-edge relation surrounded by an overlying polyester protective cover. The modules containing a PVC jacket are united to form a ribbon by a blend of fusion and hot melt adhesive material, and the protective cover is bonded thereto by the adhesive. The modules can contain polyolefin insulated wire pairs, coaxial electrical conductors, stranded or solid wire, fiber optic filaments, or the like. Semiconductive or non-conductive material can be incorporated in the PVC jacket of the modules and/or the adhesive as desired and in any combination. Drain wires can be included. Also, the cover material can include metallic layers for shielding.

25 Claims, 14 Drawing Figures

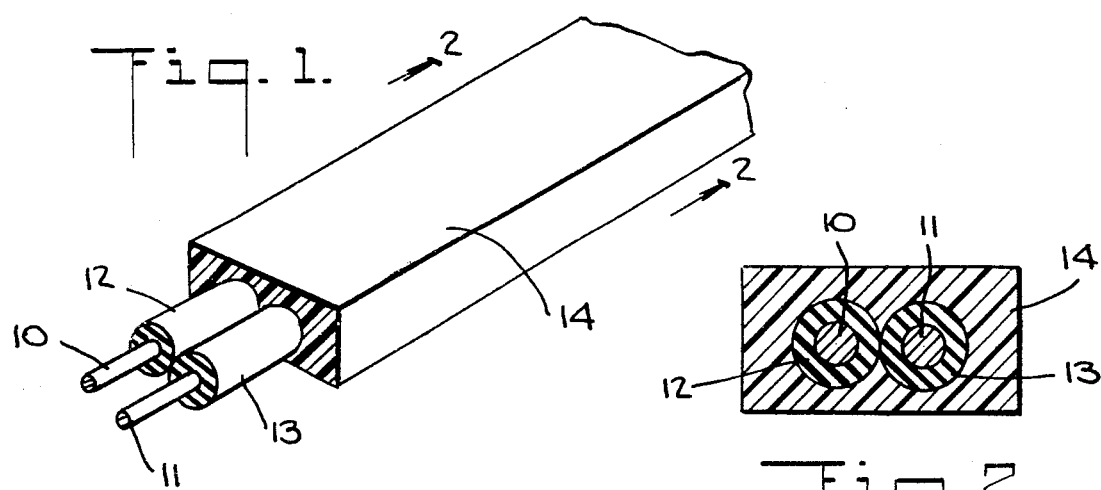
Fig. 1.
Fig. 2.
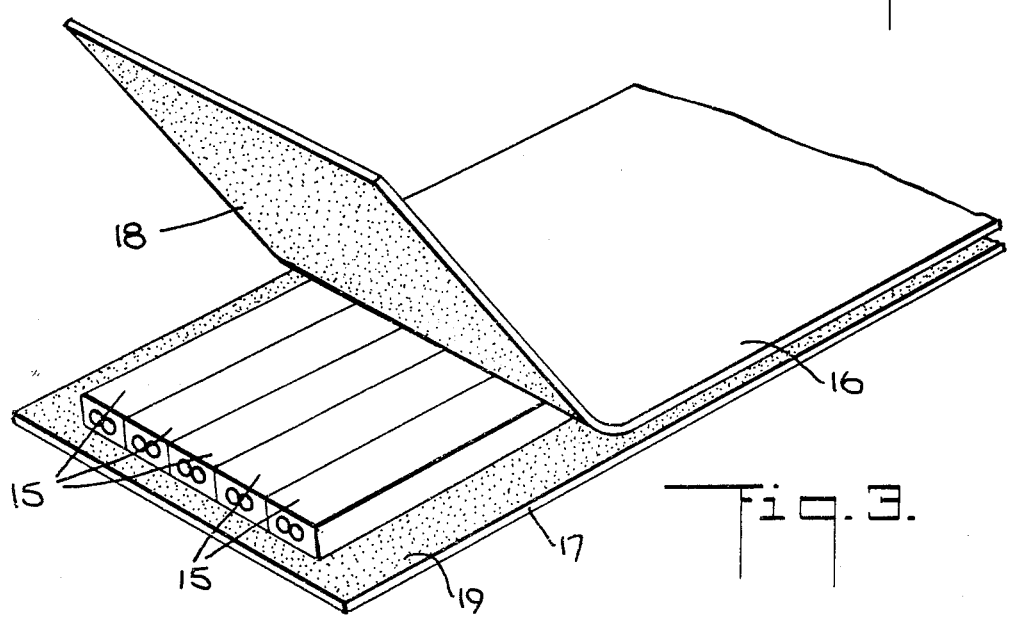
Fig. 3.
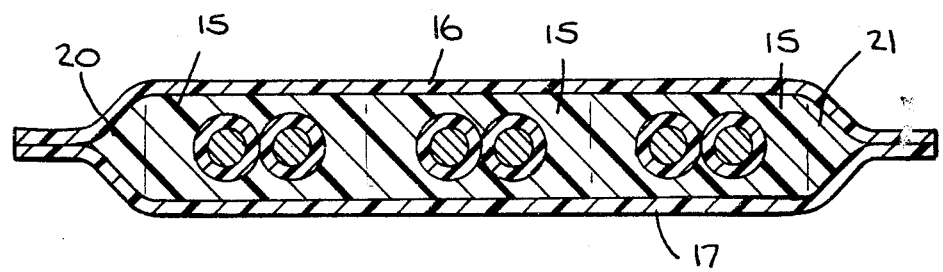
Fig. 4.

FLAT CABLE OF ASSEMBLED MODULES AND METHOD OF MANUFACTURE

BACKGROUND OF THE INVENTION

The present invention relates to communication cables and more particularly to the flat multi-conductor type suitable for laying under carpets or the like.

Stimulated by the growth of office automation with word and data processors, computers and the concept of centralized equipment serving a plurality of operators situated at separate stations, the need has developed for means capable of interconnecting a wide range of electronic equipment located at disparate points throughout an office space or facility. Flat communication cables have been developed for this purpose which cables can be laid tape-like under carpeting or other floor covering to crisscross a room interconnecting peripheral and central equipment. Available flat cables, however, are costly and have limited versatility for handling diverse communication handling requirements.

Communication cables have various functions. They carry low voltage control currents from point to point and they carry signal currents. Some of the signals require a high degree of shielding to avoid unwanted signal pollution, others do not. With classical round wire cabling an equipment manufacturer would specify the type wire and gauge, whether it is to be shielded or not, coaxial or parallel or twisted, and the cable manufacturer merely selected and bundled the appropriate elements. It is not believed that methods were known heretofore for producing flat cables with the same diversity.

It, therefore, is an object of the present invention to provide a flat communication cable that can be made with conventional equipment using low cost tooling and relatively low cost materials. The new cable construction provides considerable versatility in the selection of shielding methods both between pairs and between adjacent cables and, thus, provides control over cable characteristics such as capacitance and crosstalk.

SUMMARY OF THE INVENTION

A significant feature of the present invention is the provision of individual modules containing different types and numbers of conductors where each module has substantially the same standardized shape and size and the module dimensions are correlated with interterminal spacing of available miniature communication connectors. In accordance with the invention there is provided a flat cable comprising a ribbon containing a plurality of modules all having substantially the same external dimensions consisting of a standardized width and a lesser height and being adherently united in edge-to-edge assembly and surrounded by an adherent covering layer of material, each module including one or more signal conductors individually covered with a layer of polyolefin material and embedded non-adherently within a plastic sheath. As will be seen from the detailed description to follow, fiber optic conductors are contemplated as well as metallic conductors and the metallic conductors can be coaxial, paired, or the like. Various degrees of shielding can also be obtained.

BRIEF DESCRIPTION OF THE DRAWINGS

The invention will be better understood after reading the following detailed description of the presently preferred embodiments thereof with reference to the appended drawings in which:

FIG. 1 is a perspective view with portions broken away of a typical module for use in fabricating the cable of the present invention;

FIG. 2 is an enlarged transverse sectional view taken along the line 2—2 in FIG. 1;

FIG. 3 is a perspective view of an intermediate step in the fabrication of a typical cable in accordance with the subject invention;

FIG. 4 is a transverse sectional view through a completed cable illustrating one embodiment thereof;

The same reference numerals are used throughout the drawings to designate the same or similar parts.

DETAILED DESCRIPTION OF THE PREFERRED EMBODIMENTS

Figure 5:
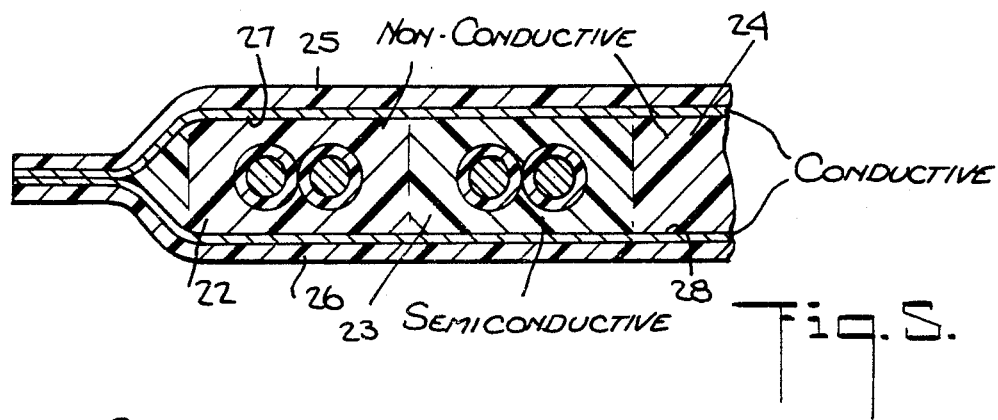
FIG. 5 is a fragmentary sectional view showing a modification of the cable of FIG. 4.

Referring to FIGS. 1 and 2 there is illustrated a typical module utilized in the construction of the flat cable in accordance with the present invention. In this particular example, a pair of metal conductors 10 and 11 are clad in individual polyolefin insulation, 12 and 13, and surrounded by a jacket, 14, of polyvinylchloride (PVC). As shown in FIGS. 1 and 2 the PVC jacket 14 has a rectangular cross-section. As will be explained below it may be desirable under certain circumstances to alter the aforesaid cross-section.

The insulation 12 and 13 can be applied by extrusion in known manner and colored for purpose of conductor tracing and identification. Typical polyolefin resins that may be used are polyethylene or polypropylene or the various fluorocarbon resins used for wire insulation and marketed under trademarks such as "Teflon" and "Halar". The basic requirement, besides dielectric characteristics for insulation purposes, is that the material in the cladding 12 and 13 have a higher melt temperature than that of the jacket 14 so as not to adhere or bond to the latter. The PVC jacket 14 can be either electrically non-conductive or semiconductive depending upon the particular application. Also, the jacket 14 preferably is compounded to include a flame retardant.

To produce a cable, the desired number of modules 15 are fed in edge-to-edge assembly as seen in FIG. 3 between two strips or webs 16 and 17 of polyester material, precoated with a hot melt adhesive on their surface 18 and 19, respectively, that engage the modules 15. Upon feeding the assembly of FIG. 3 between heated rolls or belts to heat and apply pressure thereto, the modules 15 fuse and unite along adjacent edges to produce a ribbon assembly while the adhesive 18 and 19 serves to bond the webs 16 and 17 to the adjacent surfaces of the modules 15 and to each other at the edges.

There is thus produced a structure similar to that shown in FIG. 4 which for convenience and clarity of illustration contains only three modules. In FIG. 4 the boundaries between the adjacent modules 15 are shown by faint lines, it being understood that the modules are fused or bonded together. Some of the hot melt adhesive from the coatings 18 and 19 will flow between the modules to fill any voids such that a single flat high strength ribbon with no gaps or cracks between the modules is produced. If desired, edge filler strips 20 and 21 may be added in order to eliminate voids that might exist at the edges of the cable where the web members 16 and 17 are joined together.

Another variable that can be included in the fabrication of the cables in accordance with the present invention is the electrical conductivity of the adhesive 18 and 19. Such adhesive can either be insulative or semiconductive as desired. Control of such conductivity is believed the be well known.

It was mentioned previously that the module jacket 14 may be either insulative or semiconductive. Shown in FIG. 5 by way of example is an arbitrary cable structure wherein the module 22 is formed from non-conductive PVC while the adjacent module 23 is formed from semiconductive PVC. The next module 24, only a fragment being shown, may be formed from non-conductive PVC and subsequent modules may alternate in similar fashion. Of course, several adjacent modules may have the same conductivity or insulative character, as desired. In order to provide shielding for the entire cable the enclosing covering layer 25 and 26 can be provided with metallized coatings or be laminated to metal films 27 and 28, respectively. With a construction such as that shown in FIG. 5 the metal layers 27 and 28 as well as the semiconductor PVC jackets will provide londitudinal conductivity for the cable to afford shielding of the conductors contained therein.

Figure 6:
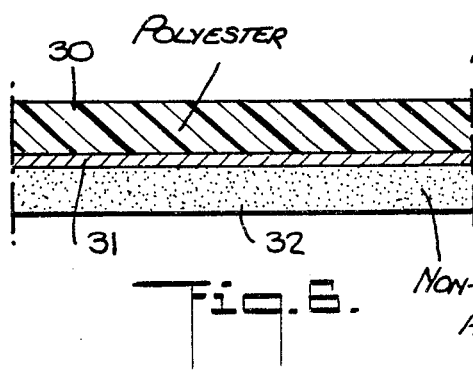
FIGS. 6, 7, 8 and 9 are fragmentary sectional views through different covering layer materials that can be utilized in the fabrication of the cables illustrated herein.
Figure 8:
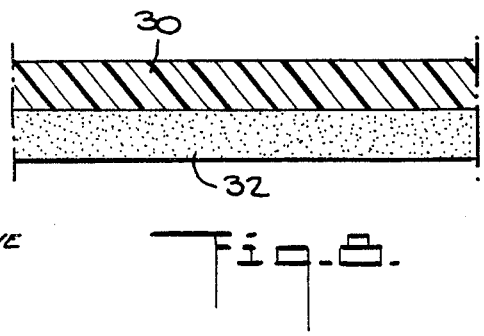
Figure 7:
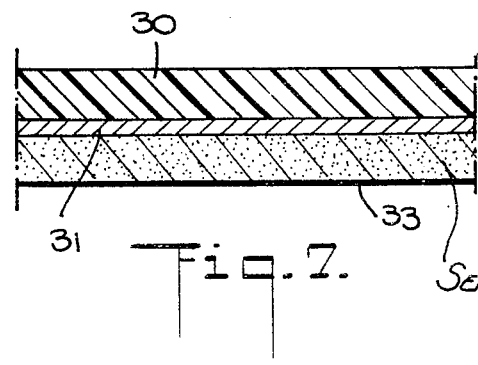
Figure 9:
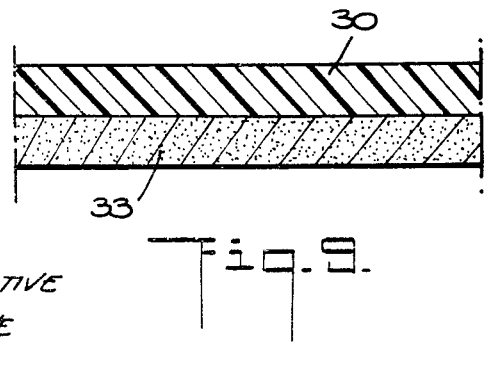

The outer covering layer or skin used in the cable construction may take any one of several forms, several examples being shown in FIGS. 6, 7, 8 and 9. FIG. 6 shows a skin having a polyester outer layer 30 laminated to a conductive metal layer 31 and a non-conductive adhesive layer 32. In FIG. 7 the skin is shown as consisting of a polyester film 30 laminated to a metal layer 31 with a semiconductive adhesive layer 33. In FIG. 8 the skin consists of a polyester film layer 30 directly laminated to a non-conductive adhesive layer 32, while FIG. 9 shows the skin 30 provided with a semiconductive adhesive layer 33.

Figure 10:
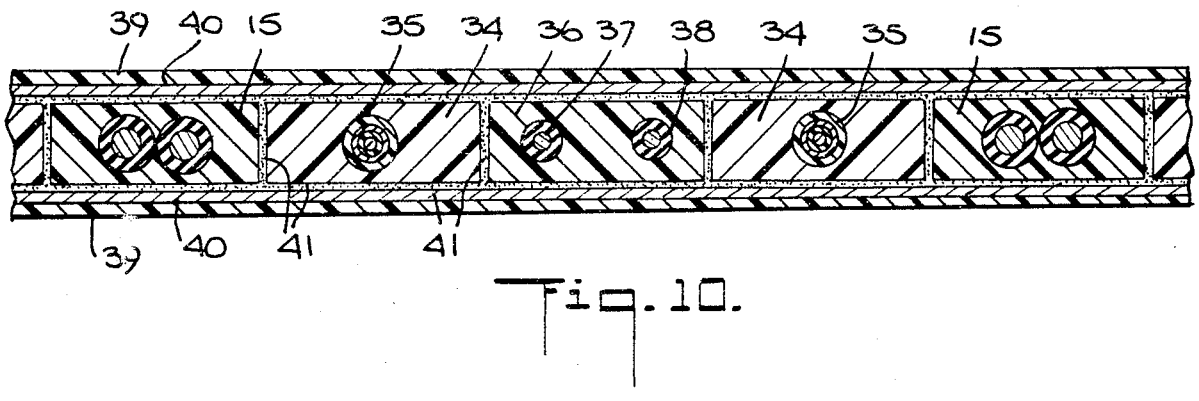
FIG. 10 is a fragmentary transverse sectional view through another cable embodiment.

In order to illustrate the versatility of the subject invention reference should be had to FIG. 10 wherein various type modules are combined in a single cable configuration. Thus, the modules 15 are shown containing electrical pairs of the type described with reference to FIGS. 1 and 2 while modules 34 are shown to include coaxial electrical conductor elements 35 produced in known manner with individual polyolefin insulation. The module 36 contains fiber optic conductors 37 and 38 each protected within their own polyolefin sheath or cladding. The skin on the cable may include an outer layer 39 of polyester, an intermediate layer 40 of electrically conductive metal, and an inner coating of semiconductive adhesive 41. The adhesive 41 is shown completely penetrating between the adjacent modules providing a semiconductive layer that surrounds the individual modules.

Figure 11:
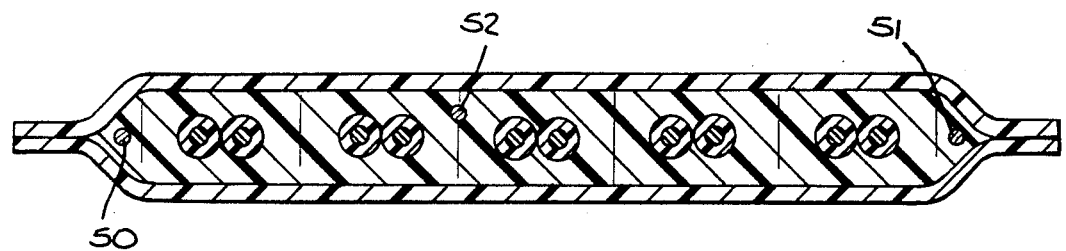
FIG. 11 is a transverse sectional view through a cable embodiment incorporating drain wires.

It should be readily apparent that the cables in accordance with the present invention can be constructed in various combinations with any desired number and type of modules. In addition, as shown in FIG. 11, drain wires can be located conveniently in semiconductive side webs at 50 and 51 as well as in the interstices between adjacent modules having semiconductive jackets such as at 52. When drain wires are incorporated in or between the semiconductive resin components such wires will reduce the longitudinal resistance of the cable and improve the electrical characteristics in known manner.

Figure 12:
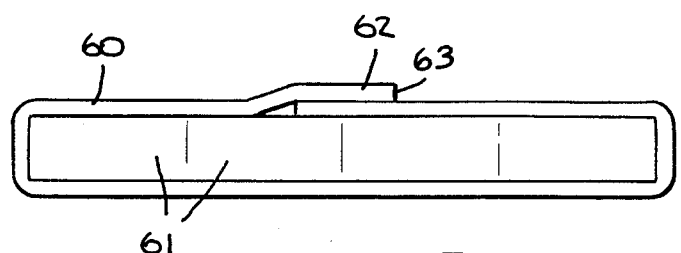
FIG. 12 is a diagramatic illustration showing a modification of the subject invention.
Figure 13:
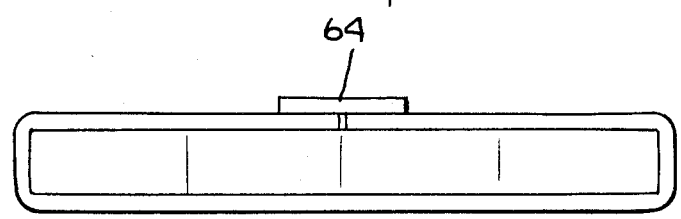
FIG. 13 is a diagramatic illustration similar to FIG. 12 showing a further modification.
Figure 14:
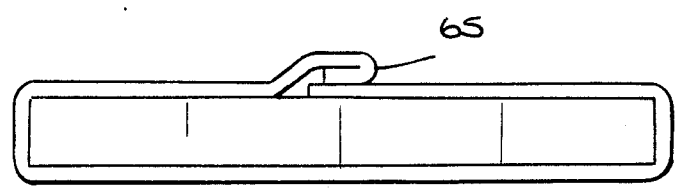
FIG. 14 is a diagramatic illustration similar to FIG. 12 showing yet a further modification.

While all of the embodiments described to this point were shown as having been produced by uniting two webs or layers of polyester skin material to the exterior of the cable, it may be preferred to apply the covering layer by wrapping as shown in FIG. 12 where the layer 60 is wrapped around the modules 61 and terminated in a lap joint 62. If the skin material contains conductive layers such as shown in FIGS. 6 and 7, it may be undesirable to have an exposed edge as at 63 in FIG. 12. Exposed edges can be avoided by employing a butt joint as shown in FIG. 13 with the joint sealed by a strip 64 of insulating material, or, as shown in FIG. 14, by folding or tucking in the edge at 65. It should be understood that the illustrations, particularly in FIG. 14, are diagrammatic and exaggerated for clarity and that the seam would not have such a pronounced bump.

In order to make use of existing miniature communication connector plugs and receptacles the module width should be selected to locate the conductors contained therein with proper spacing to match the spacing of the terminal entries of the particular connector. Typically the module shown in FIG. 2 can have a thickness of 0.030" and a width of 0.085".

When a semiconductive adhesive is employed, it can be caused to flow around each module to provide electrical shielding even when the modules are constructed of jacketing material that is non-conductive. Non-conductive jacketing can provide greater dielectric strength and higher voltage breakdown for the internal conductors by providing two layers of dielectric material surrounding each conductor. While the drawings show the modules to be rectangular in transverse section with straight sides, the edges or corners can be rounded, tapered, or otherwise shaped to facilitate manufacture and to ensure penetration of adhesive between the modules when desired. To improve fire resistance, the adhesive can include flame retardants. Fiber optic modules can be included along with the electric wire modules such as described above, and the electric wire modules may consist of one or more conductors which may be shielded or non-shielded as required. The single shielded conductors may be used for high frequency transmission similar to a coaxial cable or strip line transmission line. The electrical conductors may be stranded or solid copper depending upon the application.

Having described the present invention with reference to the presently preferred embodiments thereof, it should be understood by those skilled in the art that various changes in construction can be incorporated without departing from the true spirit of the invention as defined in the appended claims.

What is claimed is:

1. A flat cable comprising a ribbon containing a plurality of modules all having substantially the same external dimensions consisting of a standardized width and a lesser height and being adherently united in edge-to-edge assembly and surrounded by an adherent covering layer of material, each module including one or more signal conductors individually covered with a layer of polyolefin material and embedded non-adherently within a plastic sheath.

2. A flat cable according to claim 1, characterized in that said module width is selected to locate the conductors contained therein with proper spacing to match the spacing of the terminal entries of a predetermined standard miniature communication connector.

3. A flat cable according to claim 1, characterized in that at least one of said modules comprises a pair of polyolefin covered metal conductors surrounded by a sheath of polyvinylchloride.

4. A flat cable according to claim 3, characterized in that said polyvinylchloride jacket of said one module is electrically semiconductive throughout its length.

5. A flat cable according to claim 1, characterized in that said sheath of at least one of said modules comprises an electrically semiconductive material.

6. A flat cable according to claim 1, characterized in that at least one of said modules comprises a signal conductor in the form of a fiber optic conductor, and said sheath consists essentially of a plastic that is different from said polyolefin material.

7. A flat cable according to claim 6, characterized in that at least one of said modules comprises an electrical conductor covered with said polyolefin material, and said sheath consists essentially of an electrically semiconductive material.

8. A flat cable according to claim 7, characterized in that at least one of said modules comprises an electrical conductor covered with said polyolefin material, and said sheath consists essentially of an electrically insulative body of a second material.

9. A flat cable according to claim 6, characterized in that at least one of said modules comprises an electrical conductor covered with said polyolefin material, and said sheath consists essentially of an electrically insulative body of a second material.

10. A flat cable according to claim 1, characterized in that at least one of said modules comprises an electrical conductor covered with said polyolefin material, and said sheath consists essentially of an electrically insulative body of a second material.

11. A flat cable according to claim 1, characterized in that said covering layer comprises a polyester skin.

12. A flat cable according to claim 11, characterized in that said polyester skin is bonded to said modules by an adhesive.

13. A flat cable according to claim 12, characterized in that said adhesive is electrically semiconductive.

14. A flat cable according to claim 13, characterized in that a layer of metal is adherently interposed between said skin and said adhesive.

15. A flat cable according to claim 12, characterized in that a layer of metal is adherently interposed between said skin and said adhesive.

16. A flat cable according to claim 12, characterized in that said adhesive is electrically insulative.

17. A flat cable according to claim 15, characterized in that said adhesive is electrically insulative.

18. A flat cable according to claim 1, characterized in that at least one of said modules comprises a polyolefin covered coaxial cable of metal conductors surrounded by a sheath of polyvinylchloride.

19. A flat cable according to claim 3, characterized in that at least one of said modules comprises a polyolefin covered coaxial cable of metal conductors surrounded by a sheath of polyvinylchloride.

20. A flat cable according to claim 6, characterized in that said different plastic is polyvinylchloride, and at least one of said modules comprises a polyolefin covered coaxial cable of metal conductors surrounded by a sheath of polyvinylchloride.

21. A flat cable according to claim 6, characterized in that said different plastic is polyvinylchloride, and at least one of said modules comprises a pair of polyolefin covered metal conductors surrounded by a sheath of polyvinylchloride.

22. A flat cable according to claim 1, characterized in that said modules are adherently united in said edge-to-edge assembly by fusion along adjacent edges.

23. A flat cable according to claim 1, characterized in that said modules are adherently united in said edge-to-edge assembly by hot melt adhesive along adjacent edges.

24. A flat cable according to claim 1, characterized in that said modules are adherently united in said edge-to-edge assembly by a combination of hot melt adhesive and fusion along adjacent edges.

25. The method of producing a flat ribbon cable, characterized by the steps of fabricating a plurality of lengths of plastic covered conductors non-adherently sheathed, in turn, with a plastic sheathing material to produce modules all of which have substantially the same external dimensions consisting of a standardized width and a lesser height, assembling selected modules in side-by-side edge-to-edge relationship, surrounding said assembled modules along their length with a covering layer of plastic material, and applying heat and pressure to unite adjacent modules adherently together and to said covering layer.

* * * * *